United States Patent [19]

Persson et al.

[11] Patent Number: 4,639,845

[45] Date of Patent: Jan. 27, 1987

[54] VOLTAGE INVERTER

[75] Inventors: Eric G. Persson, Minneapolis; Ronald D. Veith, St. Peter, both of Minn.

[73] Assignee: GTO Electronics, St. Peter, Minn.

[21] Appl. No.: 609,470

[22] Filed: May 11, 1984

[51] Int. Cl.$^4$ .............................................. H02M 3/335
[52] U.S. Cl. ........................................ 363/26; 363/56; 363/132
[58] Field of Search ...................... 363/24, 25, 26, 56, 363/97, 98, 132

[56] References Cited

U.S. PATENT DOCUMENTS

| | | |
|---|---|---|
| 2,872,582 | 11/1957 | Norton . |
| 2,926,296 | 10/1954 | Pinckaers . |
| 3,207,972 | 9/1965 | Love . |
| 3,297,936 | 1/1967 | Ruch ..................................... 363/25 |
| 3,405,342 | 10/1968 | Wilkinson ............................. 363/25 |
| 3,437,907 | 4/1969 | Palmer . |
| 4,012,683 | 3/1977 | Ferro et al. . |
| 4,015,173 | 5/1977 | Nitsche . |
| 4,150,425 | 4/1979 | Nagano et al. ........................ 363/56 |
| 4,156,273 | 5/1979 | Sato ....................................... 363/56 |
| 4,194,239 | 3/1980 | Jayaram et al. . |
| 4,223,378 | 9/1980 | Koizumi ................................ 363/26 |
| 4,298,925 | 11/1981 | Melling . |
| 4,322,788 | 3/1982 | Yoshida . |
| 4,520,437 | 5/1985 | Boettcher, Jr. et al. ............. 363/56 |

Primary Examiner—Clifford C. Shaw
Attorney, Agent, or Firm—Merchant, Gould, Smith, Edell, Welter & Schmidt

[57] ABSTRACT

A voltage inverter is disclosed. A clock circuit provides timing signals to the electronics of the system. Electronics include a circuit for controlling the phase relationship between a pair of square waves, an overcurrent protection circuit, an auto-on circuit, a low voltage shutdown circuit, and output driver transistors for driving a primary transformer. A power transformer is connected to the primary transformer, and the output of the inverter is taken from the secondary transformer. Voltage and current magnitude indicative feedback signals are provided from the output of the inverter with the voltage signal being monitored by the phase varying circuit and the current feedback signal being monitored by the overcurrent protection circuit. Control of the off-time between alternating pulses during a cycle of the output is controlled by overlapping the square waves controlling the driver transistors for exitation of the primary transformer.

5 Claims, 13 Drawing Figures

VOLTAGE INVERTER

TECHNICAL FIELD OF THE INVENTION

The present invention relates to the field of voltage inverter apparatus.

BACKGROUND OF THE INVENTION

It is often desirable to convert a DC battery voltage into a 110 volt alternating current. Devices which perform such functions are generally termed voltage inverters, and most often are designed to operate from a 12 volt automobile battery to produce household current, for example to power television sets or microwave ovens in recreational vehicles. Such inverters are also extremely useful as backup power sources for electrical office equipment, electronic cash registers, minicomputers and even sump pumps.

SUMMARY OF THE INVENTION

The present invention provides a voltage inverter for converting a DC voltage to an alternating current. A clock circuit is provided and operates off of a DC voltage to produce a clock signal of a frequency proportionally related to that of the desired output AC current. A pulse modulation circuit receives the clock signal and a first feedback signal derived from voltage sensing at the output of the inverter to produce a pair of control signals, the timing relationship between which varies according to the voltage needed at the output to maintain a constant power output level. A dual flip-flop gating circuit receives the control signals, and produces a pair of output driver signals of constant pulse width but which vary in phase relationship to each other for controlling a pair of output driver transistors provided for commutating the DC voltage through a centertapped primary output transformer, with the output driver signals overlapping or coinciding at times when no net voltage is sought to be coupled through the primary transformer between alternating halves of a wave cycle. An auto-on circuit is provided to sense current in the output of the inverter and control the application of pulses to the primary transformer. An overcurrent protection circuit is provided and receives a second sensing signal indicative of current draw through the output of the inverter and said voltage indicative first feedback signal to disable the inverter when the output of the inverter is overloaded. A low voltage shut down circuit is also provided, and is sensitive to the DC power supply to disable the inverter when low voltage conditions in the DC supply are sensed.

DETAILED DESCRIPTION OF THE INVENTION

Figure 1:
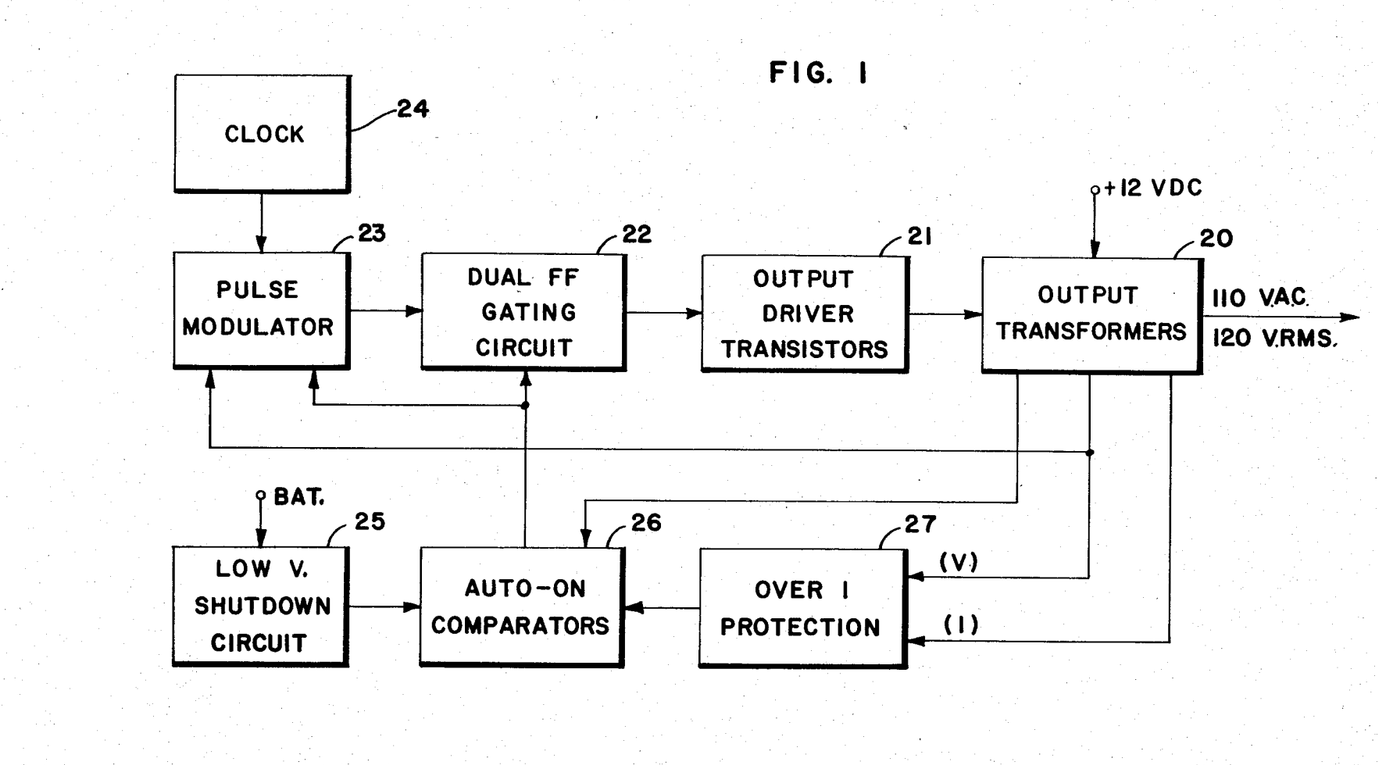
FIG. 1 is a block diagram of the voltage inverter of the present invention.
Figure 2:
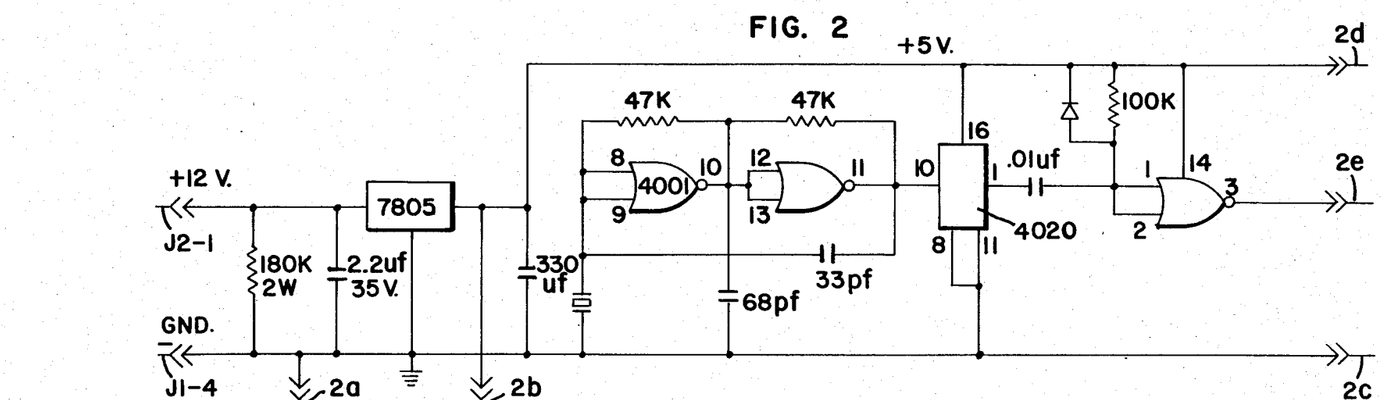
FIGS. 2-10 form a detailed schematic diagram of the electronic control circuits of the voltage inverter according to the present invention.

FIG. 1 is a simplified block diagram of the voltage inverter according to the present invention. Generally, the voltage inverter of the present invention functions to convert a DC voltage, preferably a 12 volt automobile battery voltage, to an AC voltage, which in the case of the present invention is 110 V AC, for powering conventional AC devices. Referring to FIG. 1, output transformer circuit 20 receives a 12 V DC voltage and produces a 110 volt alternating current. Transformer circuit 20 receives input control signals from the output driver transistors 21, which are connected to drive a centertapped primary transformer in transformer circuit 20, to commutate the 12 V DC voltage. Output driver transistors 21 receive a pair of square waves from a dual flip-flop timing and gating circuit 22, which receives a pair of timing signals from a pulse modulator circuit 23, and circuit enable signal from auto-on comparators 26. In operation, circuit 22 converts a pair of timing signals received from pulse modulator 23 into a pair of square waves the phase between which is constantly varied according to feedback from feedback transformers in the output transformer circuit 20 in order to maintain a constant power out condition when the output of the transformers are loaded.

The timing signals produced by pulse modulator 23 are varied in timing relationship therebetween according to a voltage feedback signal from transformer circuit 20 which is proportional to the output voltage of the inverter. An enable signal from the auto-on comparators 26 is provided for enabling modulator 23 when necessary.

Auto-on comparators 26 are provided for sensing load demands on the output of the inverter and for enabling circuits 22 and 23 only when power is demanded, whereby DC power may be conserved. Comparators 26 receive a feedback signal from current sense diodes in the transformer circuit 20 which is indicative of a demand for power output, and a disable signal from both the low voltage shutdown circuit 25 and the overcurrent protection circuit 27. Under normal operating conditions, auto-on comparators 26 are responsive to a load demand signal from the sense diodes to enable circuits 22 and 23 when necessary. However, when the DC power supply voltage drops below a predetermined level, 10 volts in the present embodiment, low voltage shutdown circuit 25 produces a disable signal to prevent auto-on comparators 26 from enabling circuits 22 and 23. Similarly, overcurrent protection circuit 27 receives the output voltage indicating feed-back signal and a current draw indicating signal from the output transformer circuit 20, to produce a disable signal to the auto/on comparators 26 when the current draw from the output of the inverter exceeds safe operating limits.

Figure 11:
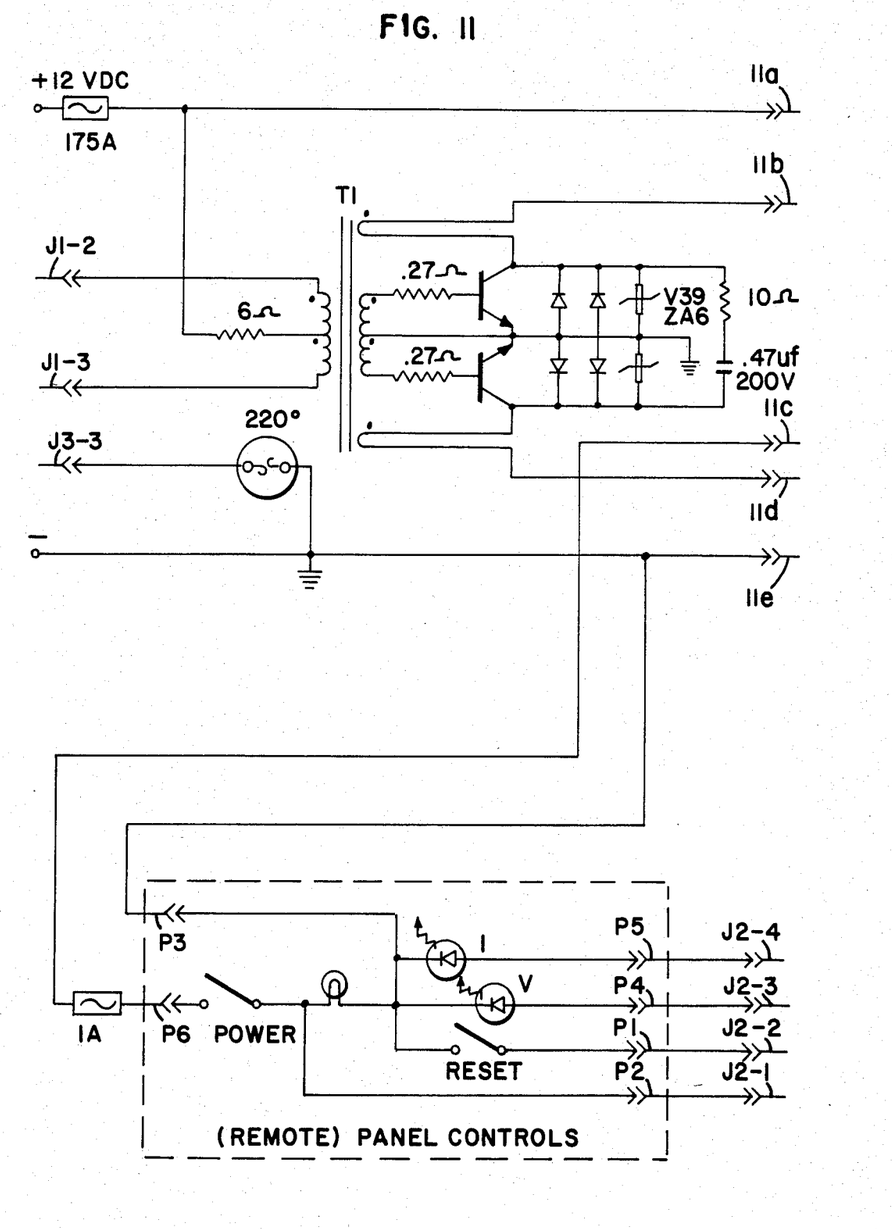
FIGS. 11 and 12 form a detailed schematic diagram of the transformer section and remote panel controls for the voltage inverter according to the present invention.
Figure 12:
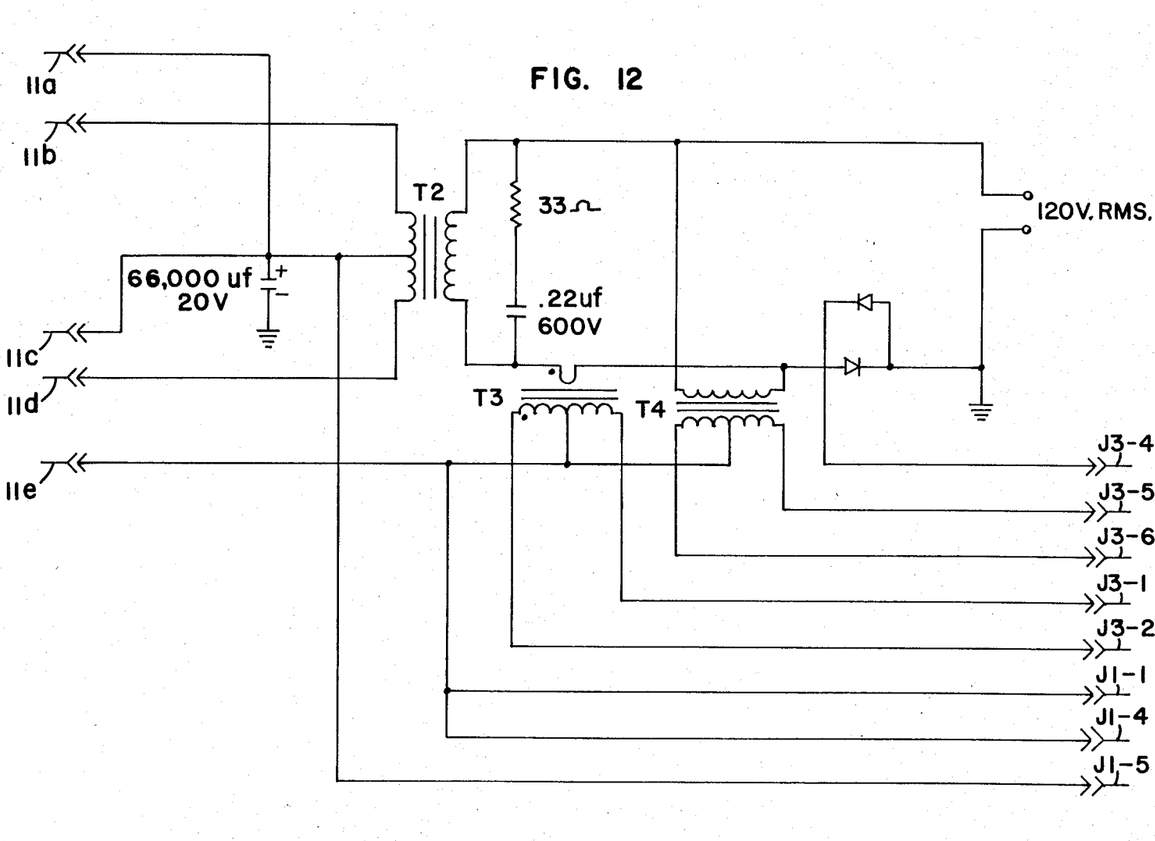

FIGS. 2-10 form a detailed schematic diagram of the electronic control circuits represented by blocks 21-27 in FIG. 1. FIGS. 11 and 12 form a detailed schematic diagram of the output transformer section representing by block 20 in FIG. 1, and in addition show the panel control also provided by the voltage inverter of the present invention which may be remote if desired. The interconnection points between the various circuits of FIGS. 2-12 are identified in those figures by corresponding labelling of the points as between the sheets.

The detailed schematic drawings will now be discussed briefly. The circuits of FIG. 2 generally correspond to the clocking circuits of block 24 of FIG. 1. A 12 V DC battery voltage is received by the circuit to produce a regulated 5 volt supply voltage and to produce a clocking signal at the output 2e.

Figure 3:
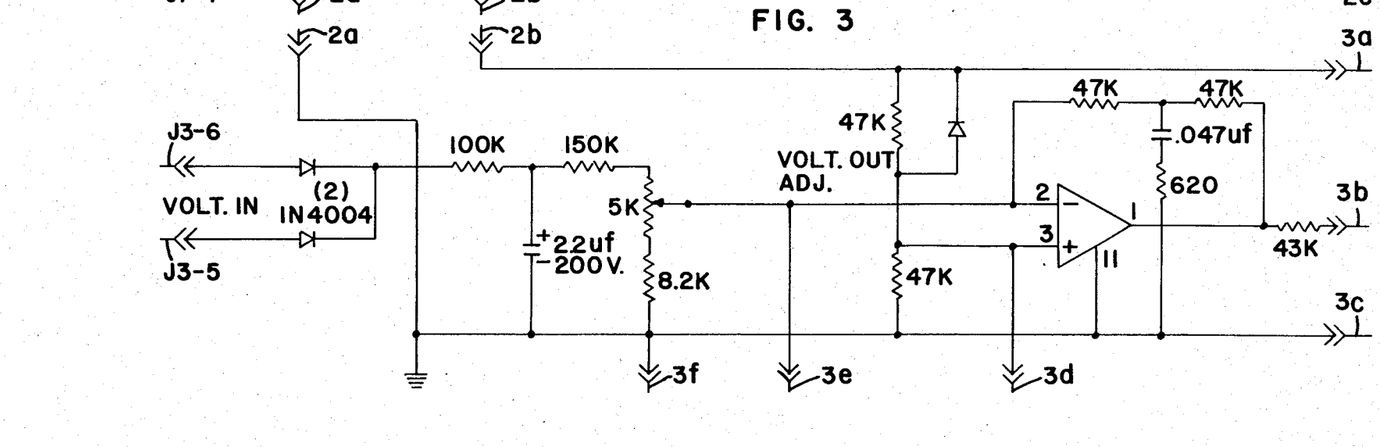
Figure 4:
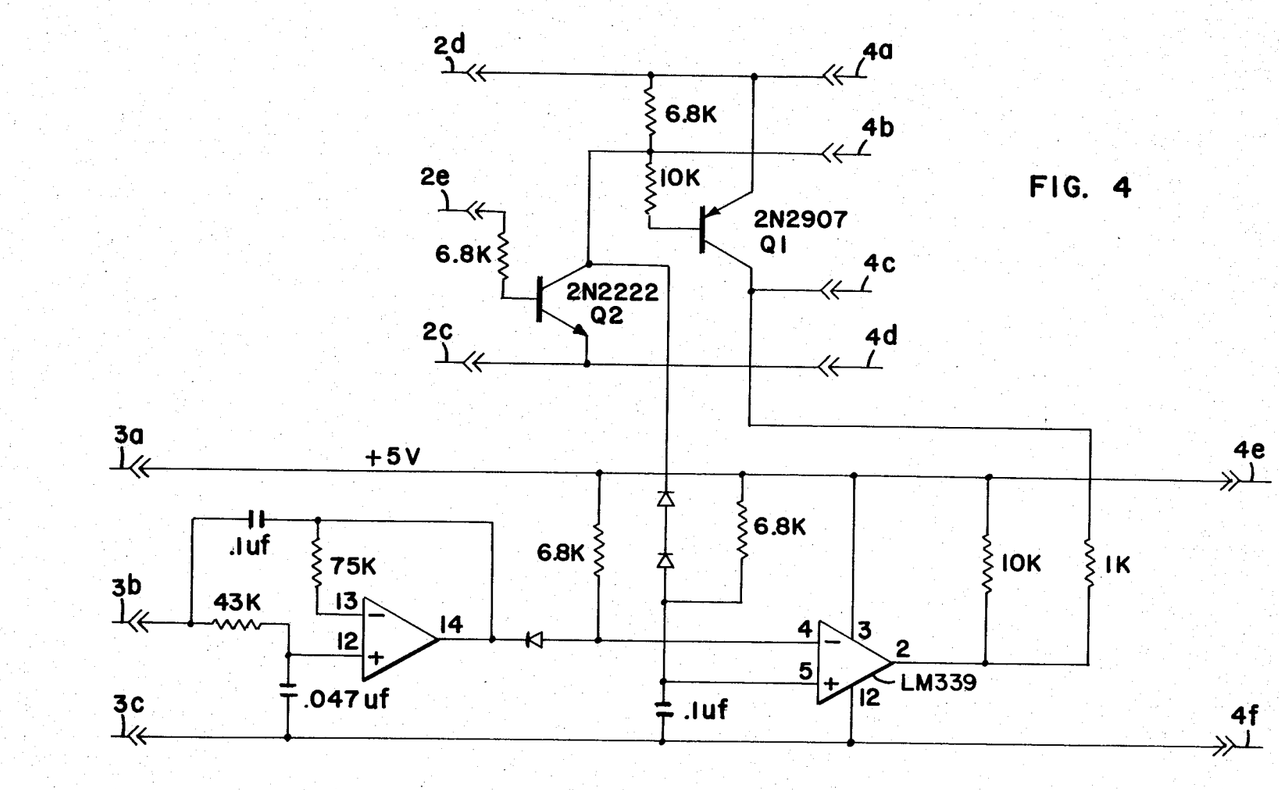

The circuits of FIGS. 3 and 4 generally correspond to the pulse modulator circuit 23 of FIG. 1. A voltage feed-back signal from the output transformers (shown in FIG. 12) and a further control auto-on signal at input 3d are received by the circuit to control transistors Ql and Q2, which receive the rocking signal from the circuits of FIG. 2 on conductor 2e. As mentioned above, the output off-time required between alternating halves of an output cycle are produced by varying an overlap in the delivery of commutating pulses to the primary transformer, which overlap or phase variance is simarily controlled by the circuits of FIGS. 3 and 4. This method of overlapping the output pulses has proved to be especially effective in isolating current or voltage spikes introduced into the output of the inverter from an AC device being powered from the remainder of the system back upstream.

Figure 5:
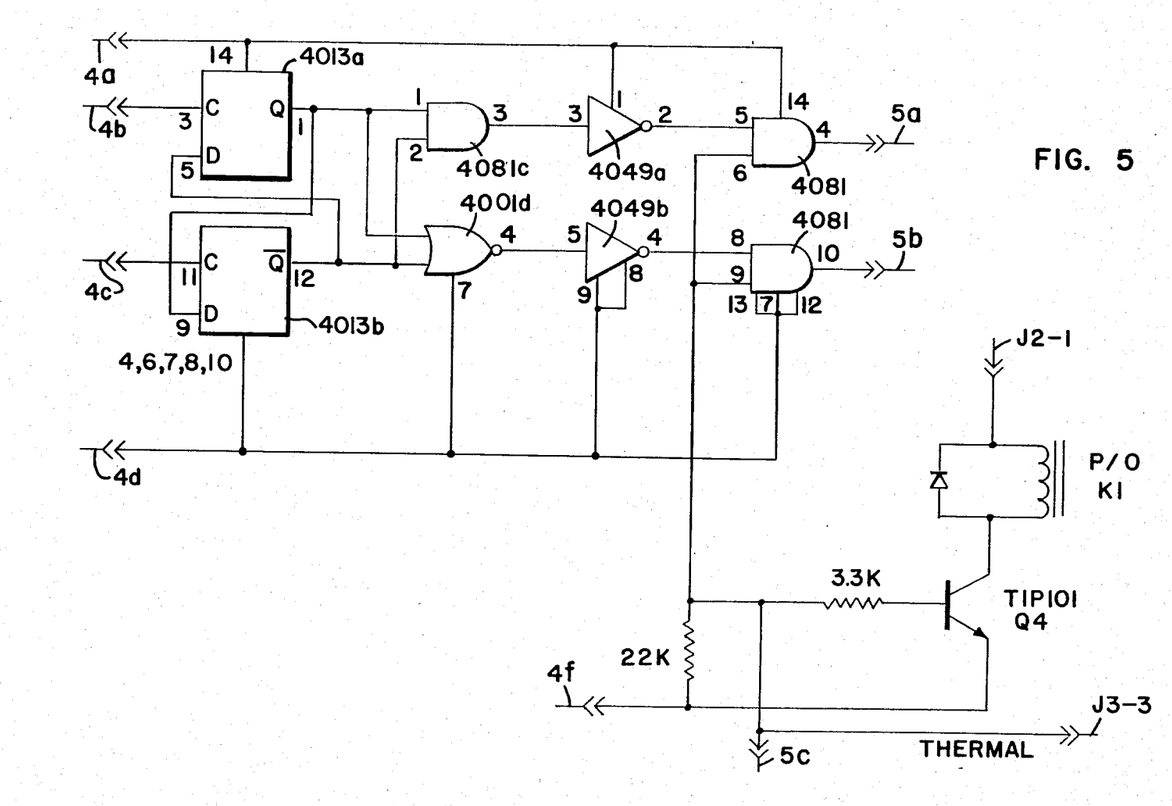

The circuits of FIG. 5 generally correspond to the dual flip-flop timing and gating circuit 22 of FIG. 1. A 4013 flip-flop receives a pair of timing signals from the transistors of FIG. 4 on conductors 4b and 4c, and works in conjunction with the logic connected at its output to produce a pair of square wave drive signals the phase relationship therebetween varying according to the output power requirements of the inverter.

Figure 6:
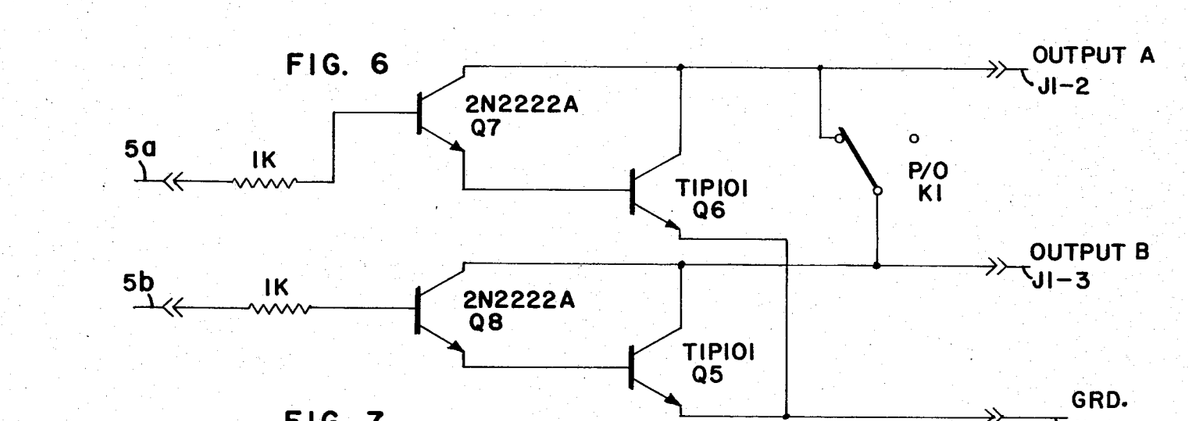

The Darlington transistor pairs of FIG. 6 generally correspond to the output driver transistors 21 of FIG. 1. Each transistor pair receives one of the square wave outputs from the circuit of FIG. 5, and are connected at their respective collectors to a primary transformer (FIG. 11) in the output transformer section of the inverter. A relay K1 is provided for fast shutdown if overcurrent is reached.

Figure 7:
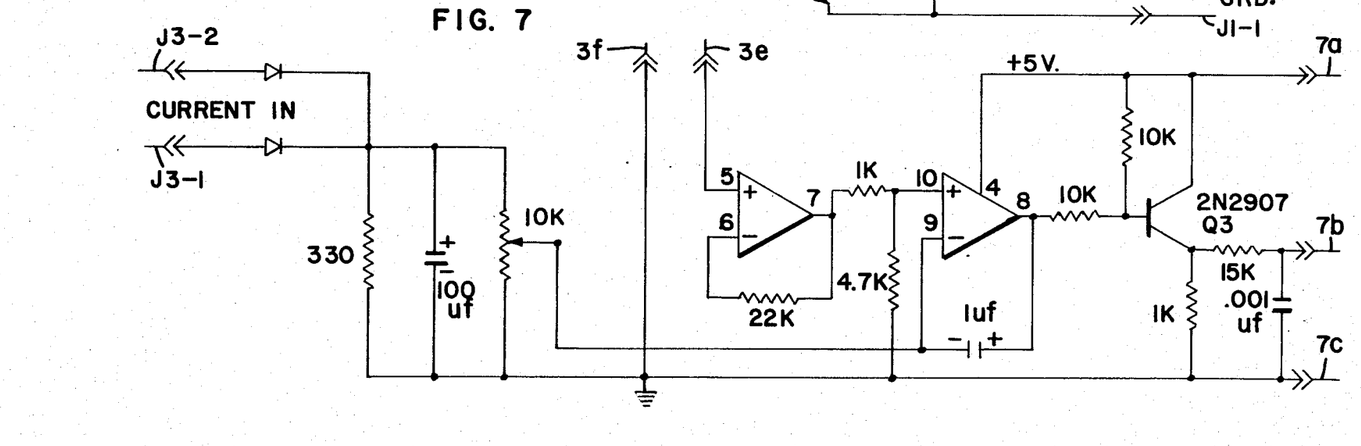

The circuits of FIG. 7 generally correspond to the overcurrent protection circuit 27 of FIG. 1. A feedback signal proportional to the current (FIG. 12) is received by the circuit, together with an output voltage level feedback signal received on conductor 3e, as produced by the circuits of FIG. 3 in response to the feedback voltage input thereto. An overcurrent disable signal is produced at output 7b for input to the circuits of FIG. 10, which also generally correspond to overcurrent protection circuit 27 of FIG. 1.

Figure 8:
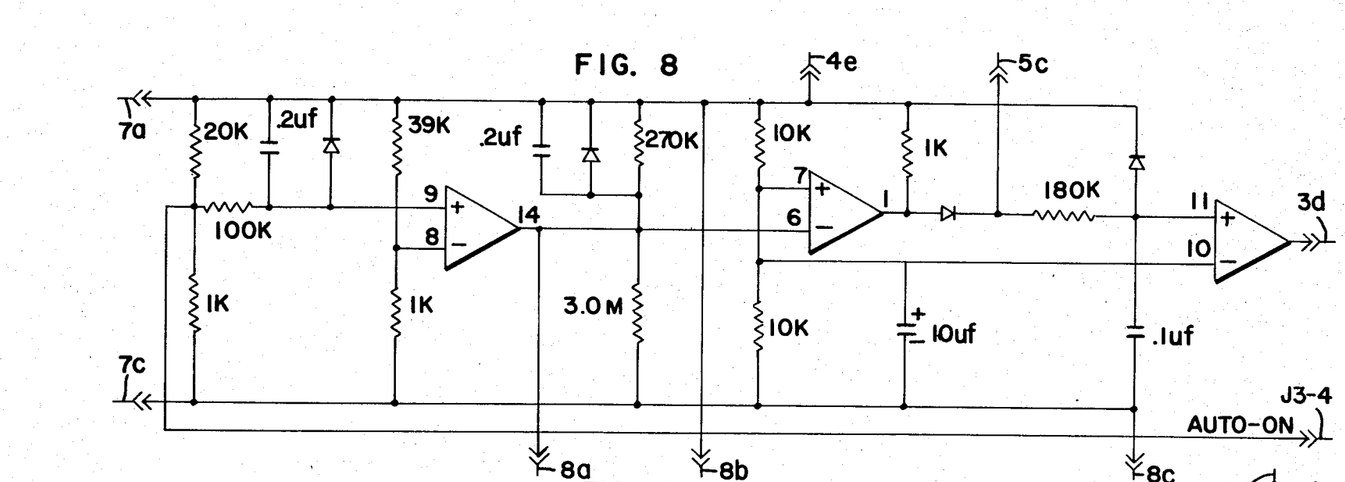

The circuits of FIG. 8 generally correspond to the auto-on comparators 26 of FIG. 1. An auto-on signal is received on a conductor J3-4 from a current sensing diode pair in the output of the inverter (FIG. 12). The auto-on signal is buffered, and assuming no overcurrent or low voltage conditions, passed along from output 3d to enable the circuit of FIG. 3 via the operational amplifier receiving that signal, and through a conduct 5c to the circuits of FIG. 5, in order to enable the and gates in the last stage of the square wave producing circuits. An auto-on disable signal is received on conductor 8a, from the output of the overcurrent protection circuit of FIG. 10 and from the low voltage shutdown circuit of FIG. 9. The presence of either a low voltage condition or an overcurrent condition detected by either overcurrent protection circuit 27 or low voltage shutdown circuit 25 may thereby disable the auto-on comparator circuit of FIG. 8 and maintain the inverter in an off output condition.

Figure 9:
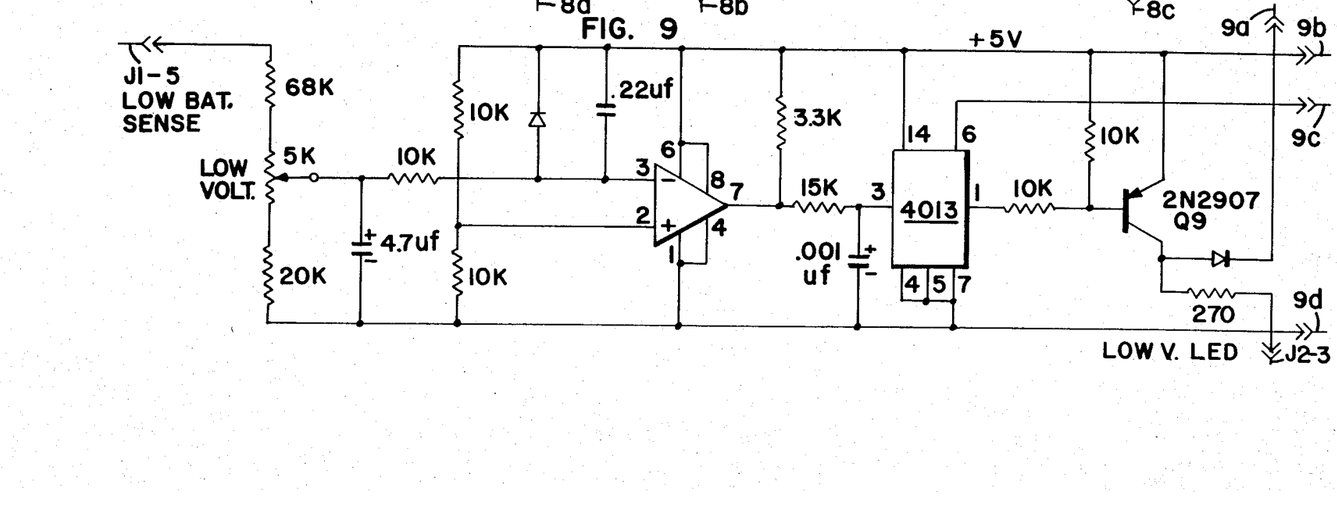

The circuits of FIG. 9, as inferred above, generally correspond to the low voltage shutdown circuit 25 of FIG. 1. A low battery sense input is derived from the output section of the inverter (FIG. 12) and is compared against the regulated 5 volt chip supply voltage for the electronic circuits in order to detect a low voltage condition, in the instant case anything below 10 volts, to produce a shutdown signal on conductor 9a. A low voltage LED is also driven via FIG. 9, which LED is shown in FIG. 11.

Figure 10:
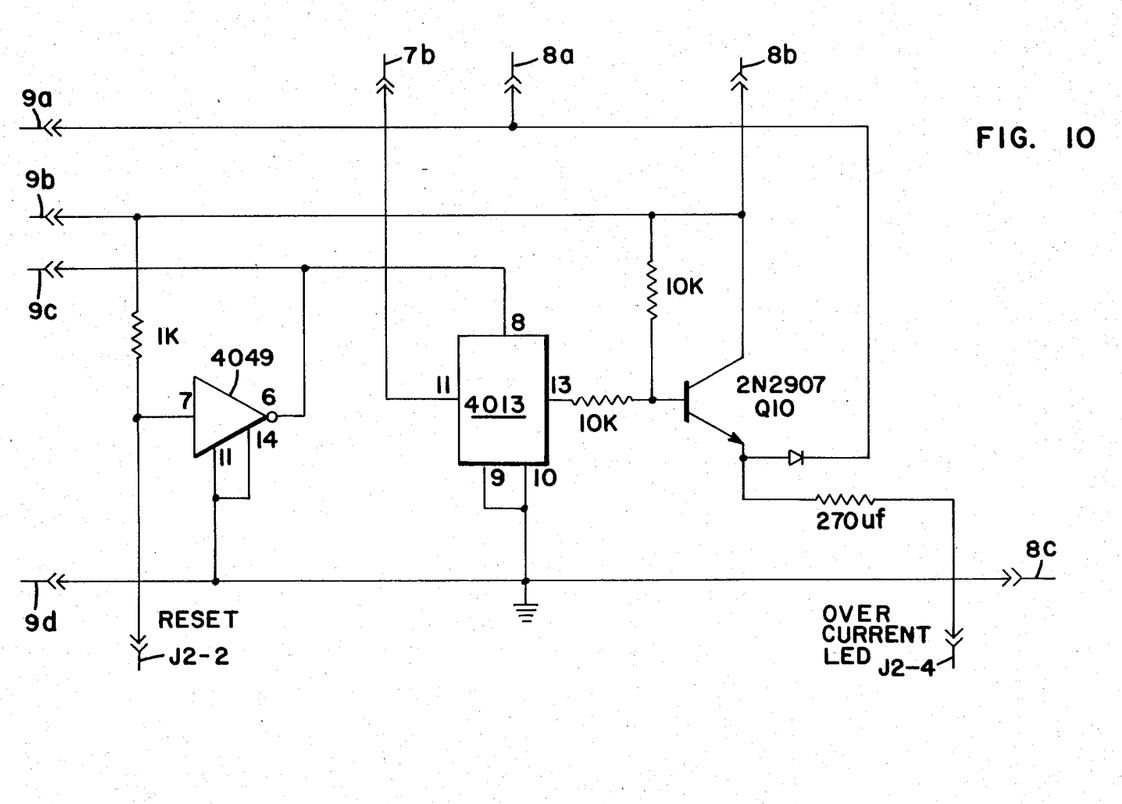

The circuits of FIG. 10, as also mentioned above, generally correspond in conjunction with the circuits of FIG. 7 to the overcurrent protection circuit 27 of FIG. 1. In addition to those aspects of the circuit of FIG. 10 that have already been described, that circuit receives a reset signal from a reset switch in the remote panel shown in FIG. 11, and produces an overcurrent LED driving signal when an overcurrent condition is sensed and a shutdown signal is produced, which LED is shown in the circuits of FIG. 11.

The output transformer section and the panel, optionally remote, controls of the voltage inverter according to the present invention are shown in FIGS. 11 and 12, as generally correspond to the output transformer circuit designated by block 20 in FIG. 1. In FIG. 11, a primary transformer T1 receives the square wave drive signals produced by the Darlington transistor pairs of the circuits of FIG. 6, in order to control the commutation of voltage across the transformer from the 12 volt DC power supply. A control circuit including a pair of power drive transistors and diodes is connected in the secondary winding of transformer T1 in order to control the transfer of energy through transformer T2 to produce the 120 V RMS output of the inverter, as shown in FIG. 12. Although shown on the secondary side as is often done in the art, it should be noted that the one-turn collector windings for the power transistors are actually on the primary winding side. Also, although only one pair of power drive transistors is shown, the present invention actually utilizes a plurality of parallel transistors, each with its own base resistor and a small emitter impedance, to accommodate the high current load demands. Also, the number of transistors may be varied according to the maximum output wattage desired, and should be of low VCE saturation voltage to minimize heat buildup.

A thermal fuse is provided and mounted in proximity to the output transformers and is connected to the thermal overheating shutdown connection J3-3 of FIG. 5, so that if the temperature at the output of the transformers exceeds 220 degrees F. the unit will shut down.

The panel controls shown in FIG. 11 enable the voltage inverter of the present invention to be controlled from a remote location, for example a dashboard when the unit is mounted in a recreational vehicle. A power on switch is provided, and provides a link from the direct connection to the DC battery voltage supply tapped off of the center tap of transistor T2 and delivered through conductor 11c and a one amp fuse. When on, power is delivered to the 12 volt supply input of FIG. 1 on conductor J2-1. A reset switch is also provided on the remote panel, in order to reset the inverter after it has been latched off by the occurrence of either an overcurrent or low voltage condition, with the 12 volt reset signal being delivered to the J2-2 conductor input reset for the circuit of FIG. 10. The aforementioned overcurrent and low voltage indicating LEDs are also provided on the remote panel, and are connected as described above.

Referring to FIG. 12, the current load demand, voltage sensitive feedback, and current sensitive feedback sensors may be seen, as connected to conductors J3-4, J3-5 and 6, and J3-1 and 2.

The circuits of the present invention use a voltage feedback signal to monitor the output voltage and vary the duty cycle of the output voltage in response to the varying conditions. The duty cycle of the output voltage is varied by the means of overlapping timing signals, whose overlap increases or decreases according to the changing input voltage and output loading conditions. The amount of the overlap of the timing signals is determined by the AC voltage output feedback signal.

Figure 13:
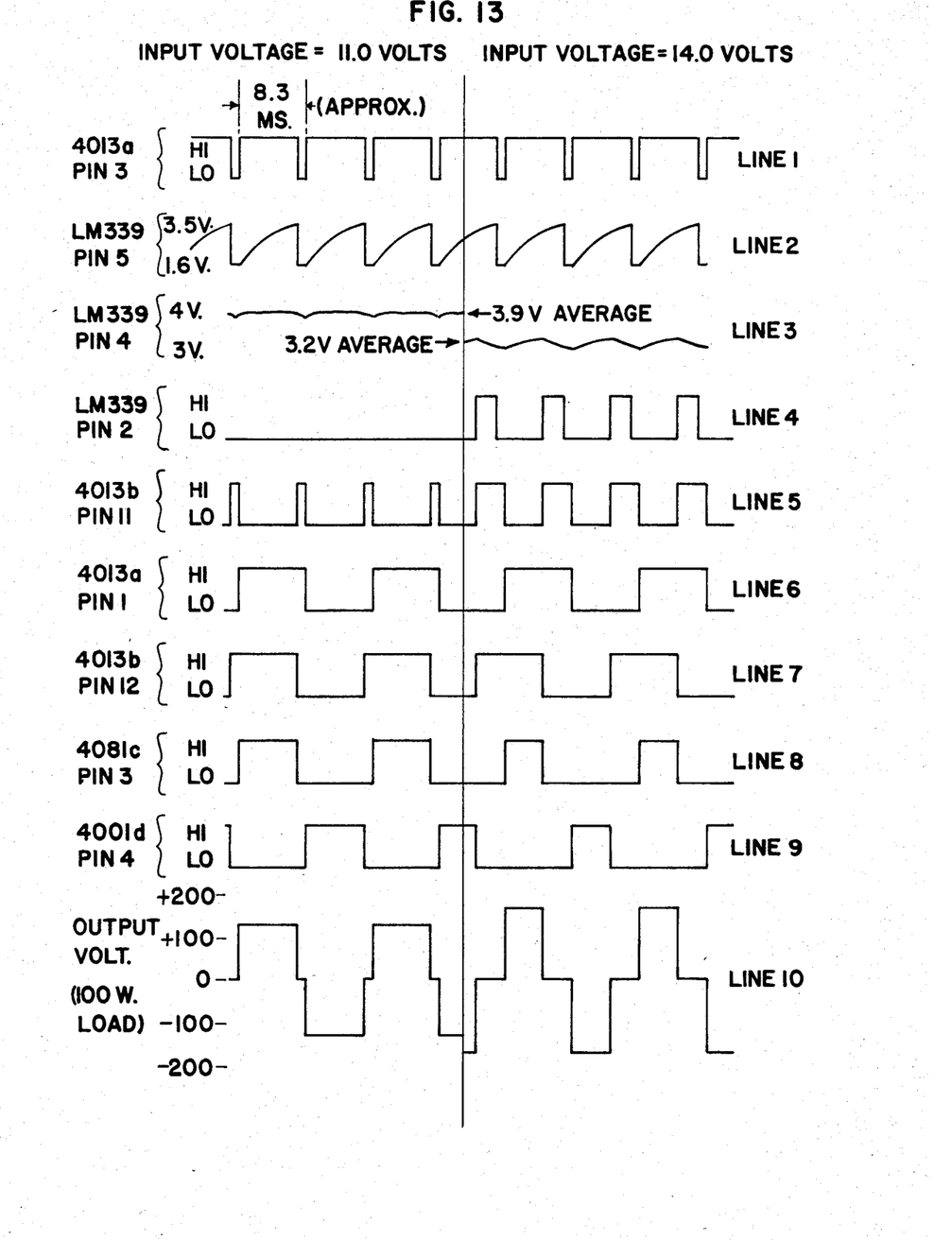
FIG. 13 is a timing diagram corresponding to the operation of the voltage inverter according to the present invention.

FIG. 13 is an illustrative timing diagram which represents the above-mentioned operation of the present invention. The left-hand side of FIG. 13 represents the operation of the circuit when the input DC voltage is at approximately 11 volts. The right-hand side of FIG. 13 represents the operation of the circuit for the present invention when the input DC voltage is approximately 14 volts. Line 1-10 of FIG. 13 correspond to timing signals which would be generated at the circuit locations identified in the left-hand margin.

The collector of transistor Q2 produces an inverted 120 Hz pulse train of a high, non-varying duty cycle, a shown in FIG. 13, line 1. The clocking signal from transistor Q2 is used to drive (indirectly) the non-inverting input of comparator LM339 of FIG. 4, the base of transistor Q1, and the clock input to positive edge triggered flip-flop 4013a, pin 3. Flip-flop 4013a is one-half of an industry-standard CMO 4013 dual flip-flop chip. Flip-flop 4013b is the other half of the same package.

The collector of transistor Q1 produces a 120 Hz clock cycle of a varying duty cycle which is used to drive the clock input of flip-flop 4013b pin 11. The collector of transistor Q1 is either pulled to a logical 1 or a logical 0 or ground position depending on the outputs of differential voltage comparator LM339 found on FIG. 4 or the presence of an active clock signal applied to its base by transistor Q2. This signal is shown as line 5 of FIG. 13.

Differential voltage comparator LM339 monitors the AC output voltage in response to changing DC input voltages and AC output loading conditions. The inverting input to differential voltage comparator LM339 is fed by an inverted voltage feedback signal from the output transformer in FIG. 12. This signal represented by line 3 on FIG. 13. The feedback signal shown on the left indicates approximately a 3.9-VDC feedback voltage corresponding to a 130-VAC peak output voltage. The 3.2-VDC feedback signal on the right side of line 3 indicates a 170-VAC peak output voltage.

The noninverting input to LM339 on FIG. 4 is a sawtooth signal as shown in FIG. 13, line 2. This waveform is generated from the 120-Hz pulse train found on the collector of transistor Q2 and passed through the RC network driving the noninverting input of comparator LM339. The voltage differential comparator LM339 on FIG. 4 will then produce a high output when the noninverting input exceeds the inverting input.

The DC feedback voltage representing the output AC voltage is an inverted signal whereby a low AC output voltage will represent a higher feedback voltage, and a high AC output voltage will represent a lower feedback voltage. The feedback voltages are in the range of 3 to 4 volts, as shown in line 3. The effect of a lower DC feedback voltage on comparator LM339 is that the tips of the sawtooth pattern presented on the noninverting input will exceed the threshold voltage presented on the inverting input. As the sawtooth signal exceeds the feedback reference voltage presented to the comparator, the output of the comparator goes active. The duty cycle of the wave form on the output of differential voltage comparator LM339 is dependent on the length of time the sawtooth wave form exceeds the DC feedback reference voltage. The pulsewidth, as shown on line 4 of FIG. 13 on the right, will be very wide for a very low feedback voltage. Recalling that the low feedback voltage represents a high output AC voltage, it can be seen that the wider pulsewidths on the output of differential voltage comparator LM339 correspond to a higher output voltage which in turn corresponds to a high-input DC source voltage and/or a small-output load on the AC output. Hence, the output of differential voltage comparator LM339 will vary from no pulses when a low AC output voltage is present to very wide pulses that correspond to a high AC output voltage.

It can be seen from lines 1 and 5, respectively, of the timing diagram that the clocking signal for flip-flop 4013a is a nonvarying duty cycle, while the clocking input for flip-flop 4013b has a varying duty cycle which varies according to the DC input voltage and the AC output loading conditions. In FIG. 5 the output of flip-flop 4013a drives the data input (pin 9) of flip-flop 4013b, and the output of flip-flop 4013b drives the data input (pin 5) of flip-flop 4013a. This form of feedback network insures that the Q output of flip-flop 4013a (pin 1) will always follow the $\bar{Q}$ output of flip-flop 4013b (pin 12), delayed only by the amount of time that their input clocking signals are out of phase. The outputs of flip-flop 4013a and flip-flop 4013b are shown in FIG. 13 on lines 6 and 7 respectively. The output from flip-flop 4013a shown on line 6 does not vary over the changing conditions of input voltage and output loading. However, the output from flip-flop 4013b varies its phase in relation to the output of flip-flop 4013a depending upon the changing DC input voltage and AC output loading conditions. The changing of the phase between the two flip-flop outputs is due to the changing of the clocking pulsewidth shown on line 5.

The outputs of flip-flops 4013a and 4013b are used to create the drive signals for the output commutating transistors. Line 8 of FIG. 13 represents the output from logical AND gate 4081c. This signal represents the amount of time that the AC output voltage in the positive-going direction should be on. Line 9 represents the output of logical NOR gate 4001d. This drive signal represents the amount of time that the negative going output AC voltage should remain on. It can be seen by comparing lines 8 and 9 of FIG. 13 that an overlap region always exists between the control pulses in which both pulses are off.

Referring to FIG. 5, the output of logical AND gate 4081c and the output of logical NOR gate 4001d are inverted by logical inverting gates 4049a and 4049b, respectively, and used to drive the Darlington pair transistors found in FIG. 6. The control signal found on the base of transistor Q7 of the Darlington pair Q7-Q6 is the inverted value of line 8 shown in FIG. 13. The control signal found on the base of transistor Q8 of Darlington pair Q8-Q5 shown in FIG. 6 is the inverted value of the signal shown on line 9 of FIG. 13. By comparing the inverted value of line 8 to the inverted value of line 9, it can be seen that both Q7-Q6 and Q8-Q5 Darlington pair driver transistors are in an active or on state for the period in which the signals overlap. This overlapping technique is used to dynamically change the magnetic field of output control transformer T1. By dynamically changing the magnet flux induced in the primary side of output control transformer T1, there is always an actively-driven magnetic field found on the secondary side of the output control transformer. This technique eliminates voltage spikes in the AC output of this voltage inverter. If the Darlington pair control transistors of FIG. 6 were allowed to both be off at the same time, the magnetic field of control transformer T1 would passively collapse during that time period. It is well known in the art that a collapsing magnetic field tends to produce very high voltage spikes, as the field attempts to collapse in the shortest time possible. This results in voltage spikes in the secondary side of a transformer. Hence, this technique of dynamically changing the magnetic field of control transformer T1 by allowing the control transistor Darlington pairs to both be on at the same time eliminates voltage spikes or voltage surges in the AC output of the voltage inverter circuit.

FIG. 13, line 10 represents the quasi-sine wave AC output voltage signal found on the output of the voltage inverter transformer section shown in FIG. 12. The peak output voltage shown on line 10 varies between approximately 130 volts AC when the DC input voltage is approximately 11 volts to approximately 170 volts AC when the DC input voltage is approximately 14 volts under a constant output load of 100 Watts. This peak output voltage is dependent on the DC input voltage because fixed component values are used in the transformer output section as shown in FIGS. 11 and 12. However, to maintain a constant 120 volts RMS average power output of this voltage inverter, the amount of time that the peak output voltage is allowed to be ON is varied. Hence, it can be seen on line 10 that the peak output voltage on the left side of FIG. 13 is only 130 volts but the duration of the AC output signal is quite large. On the right-hand side of FIG. 13, the peak out voltage on line 10 is approximately 170 volts but the duration of that voltage signal is quite small. Hence, the effective or RMS voltage output is maintained constant irrespective of the input load or DC input voltage.

Thus there has been described above a voltage inverter apparatus according to the present invention of light weight, efficient design and which provides for simple remote control, if desired. The method and apparatus for sensing load conditions and controlling the commutation of power throught the output transformers provides for efficient utilization of the DC power supply source and for protection from voltage spikes reflected back into the system.

While the inverter according to the present invention has been described in its preferred form, those skilled in the art will recognize that many modifications, changes or additions thereto may be made without departing from the spirit and scope of the invention as set forth in the claims appended hereto.

We claim:

1. A voltage inverter comprising:

clocking means for producing a clock signal;
   output drive transistors for switching DC voltage in response to first and second drive signals;
   primary output transformer means connected to said output drive transistors for commutation of said switched DC voltage through said transformer;
   power output transformer means controlled by said primary transformer means for commutating of DC power through to an inverter output to produce an AC voltage;
   voltage sensing means connected to said power output transformer means for producing a first feedback signal indicative of the magnitude of the AC voltage output;
   pulse modulation means receiving said clock signal and said first feedback signal and operative in response thereto for producing first and second square wave control signals, the phase relationship between said control signals being varied according to the magnitude of the AC voltage output; and
   gating circuit means receiving said first and second square wave control signals for producing said first and second drive signals such that the first drive signal always has a greater active duty cycle than the second drive signal, causing said output drive transistors to be simultaneously active for the period of overlap between the active duty cycles of said first and second drive signals whereby the magnetic field in said primary output transformer is dynamically switched suppressing voltage spikes on said inverter output.

2. A voltage inverter according to claim 1 further including auto-on means for sensing current demand in said power output transformer means and operable in response thereto for controlling the application of said first and second square wave signals to said gating circuit means such that the commutation of voltage through said transformers may be suspended when no demand is present.

3. A voltage inverter according to claim 2 further including a low voltage shutdown circuit responsive to low DC voltage supply levels and operably connected to said auto-on means to cause said auto-on means to suspend application of said first and second square waves to said gating circuit means.

4. A voltage inverter according to claim 2 further including overcurrent protection means for sensing current draw through the power output transformer, for monitoring said first feedback signal and operable in response thereto for causing said auto-on circuit to suspend application of said first and second square waves to gating circuit means when the threshold maximum output power level is passed.

5. A voltage inverter according to claim 1 wherein said output drive transistors comprises a pair of transistors and said primary output transformer means includes a centertapped primary winding, wherein each of said transistors control one half of the commutation of voltage through said primary output transformer means.

* * * * *